United States Patent [19]

Bray

[11] Patent Number: 4,680,706

[45] Date of Patent: Jul. 14, 1987

[54] RECLOSER CONTROL WITH INDEPENDENT MEMORY

[75] Inventor: Thomas J. Bray, Shaker, Ohio

[73] Assignee: Cooper Industries, Inc., Houston, Tex.

[21] Appl. No.: 615,563

[22] Filed: May 31, 1984

[51] Int. Cl.⁴ .................. G01R 19/00; H01H 47/00
[52] U.S. Cl. ......................... 364/492; 307/132 EA; 361/75; 364/483; 365/228
[58] Field of Search ............... 364/200, 900, 480, 481, 364/483, 492, 707; 361/72, 75; 307/132 EA; 365/205, 227, 228, 229

[56] References Cited

U.S. PATENT DOCUMENTS

| | | | |
|---|---|---|---|
| 4,419,619 | 12/1983 | Jindrick et al. | 364/483 |
| 4,458,307 | 7/1984 | McAnlis et al. | 364/200 |
| 4,523,295 | 6/1985 | Zato | 364/900 |
| 4,535,409 | 8/1985 | Jindrick et al. | 364/492 |
| 4,564,922 | 1/1986 | Muller | 364/900 |

Primary Examiner—Parshotam S. Lall
Assistant Examiner—Kevin J. Teska
Attorney, Agent, or Firm—Nelson A. Blish; Eddie E. Scott; Alan R. Thiele

[57] ABSTRACT

A microprocessor based recloser control including a independent memory is disclosed. The independent memory is alterable by processor means and by input and output means independent of the processor means. The independent memory is non-volatile and requires little energy to alter its contents. Events which would otherwise be ignored when the processor means is disabled, because of an insufficiency of power for reliable operation, are recordable in the independent memory.

8 Claims, 7 Drawing Figures

RECLOSER CONTROL WITH INDEPENDENT MEMORY

BACKGROUND OF THE INVENTION

This invention relates to providing an independent memory for microprocessor controlled recloser controls. An example of a microprocessor controlled recloser control is provided by U.S. Pat. No. 4,535,409 filed Sept. 18, 1981 of which I am an inventor. That application is in its entirety hereby incorporated by this reference into this application.

Generally, in an electric power distribution system, there are a great number of protective devices for interrupting excessive current flows which tend to damage the current conductors or other distribution equipment. An examination of a system would generally disclose an upstream protective device close to the power source capable of interrupting the entire load served by the power source. The upstream device is generally suceeded by a number of downstream devices of sucessively lesser interrupting capability, each being capable of interrupting the load they protect. It is most desirable to interrupt a fault, excessive current, with the protective device which is closest to the malfunction causing the fault in order to minimize the area of power outage. To this end, a number of protective devices may be placed in series, to conduct current to a load. Then when a fault occurs, only the one closest to the fault should operate to interrupt the fault.

It is also desirable that a protective device respond quicker to faults of greater magnitude than to faults of lesser magnitude. However, it is not desirable that a protective device respond quickly to every current in excess of design limits, since such currents may often be caused by a malfunction of such short duration that no harm to the system will occur. A branch striking a power line due to a gust of wind can cause such a malfunction. Therefore, most protective devices have time current characteristics which delay their response to less excessive current and yet accelerate their response, so that they respond more quickly, to faults of greater magnitude.

A graph of the time current characteristic, showing the time it takes for the device to respond to a fault of a specific magnitude, often results in a straight line when plotted on a log-log scale. Some care should be taken to coordinate among protective devices in a system so that the time current characteristic of an upstream protective device is always greater, i.e. responds more slowly, than a downstream device. Unless such care is taken, a larger area than necessary will suffer power outages needlessly.

Unfortunately at high magnitudes of fault current, the time current characteristics of many protective devices tend to merge. At these levels of fault, coordination among protective devices can be lost. When coordination is lost, several protective devices may respond, or an upstream protective device may respond before a downstream device. To ensure that coordination is not lost under these circumstances, a minimum time delay may be introduced for each of the devices, so that despite merger of their time current characteristics, the device furthest upstream will be the last to open because it has the longest minimum time delay. Due to the complexity of modern power distribution systems and despite precautions, it is not always possible or desirable that coordinations be preserved.

Reclosers are inserted into power lines to protect a power distribution system. Most faults on power distribution lines are of momentary nature and of sufficient magnitude to blow fuses if allowed to be conducted by them for a sufficient period. When a fuse does blow in a power distribution system, it is necessary to send somebody to change it which is a somewhat expensive proposition. A primary function of a recloser is to save fuses. In general, this is done by sensing the peak value of the current conducted and interrupting its flow by opening or tripping a recloser before the fuses can blow. After an interval, the recloser closes and restores power to the system where it remains closed until the next fault is sensed. The rate at which a fuse will blow and interrupt current is a function of the thermal heating of the fusible element. The rate of thermal heating is proportional to the power generated by the fault and each fuse has a time current characteristic which describes the time interval required to interrupt the fault current. The time interval is generally approximately inversely proportional to the value of the root mean square, squared of the fault current. It is desirable to coordinate the recloser with the fuses to be saved to insure that the recloser in fact interrupts temporary fault currents before the fuses to be protected are blown. This is generally done by approximating the root mean square value of the fault current by sensing its peak value.

It must also be recognized that all faults which occur on a power distribution line are not temporary, such as those caused by a branch momentarily falling against the line. Some faults are of a more permanent nature such as those caused by a line falling to the ground. As a consequence, reclosers are built so that they will only trip a limited number of times within a short duration before locking open. Were this not done a recloser would cycle until failure and many of the fuses to be protected would blow anyway. At some magnitude of fault current it is desirable to have the recloser open immediately to protect the line rather than following a time current characteristic. At intermediate levels, it may be desirable from the power distribution standpoint to allow the fault current to flow for a limited period to allow the fault to burn itself open or blow the fuse. Many reclosers have alternate time current characteristics which achieve this goal. Typically a recloser will allow two shots or trip operations to follow a fast time current characteristic and two additional shots along a somewhat slower time current characteristic before locking open or out.

Microprocessor based recloser controls possess a number of advantages which were lacking in the electronic recloser controls which were their forerunners. Most advantages relate to their flexibility and self-diagnostic abilities which largely result from their ability to store and use comparatively great amounts of information in their memory. However since microprocessor based recloser memories are controlled by processing means, the memories cannot be altered unless sufficient power is being supplied to the microprocessor to allow it and related devices to function reliably. Power supplies for recloser controls typically include batteries as energy storage means. However the ability to supply power to a microprocessor in a recloser control for extended periods of time when an upstream device has interrupted power to its power supply is limited. As a result, events can occur when the microprocessor is disabled which are not remembered by the microprocessor associated memory.

A particular sequence of events illustrates one drawback to the inability of microprocessor memory to function during periods of extended power outage. A given recloser trips due to a temporary fault condition. As the recloser control is attempting to reclose its battery lacks sufficient reserve to allow the microprocessor to reliably function and the microprocessor is disabled, aborting the reclosing attempt. Power is restored to the system but, the recloser remains open because the control has initialized its state and conformed to the state of the recloser. It is necessary that the control conform to the recloser to avoid inconsistent operation of the recloser. The result is a power outage downstream of the recloser when no fault condition exists.

An alternative to the outage would be to close the recloser on every occasion that the control is resupplied power. In the past a similar approach was taken but the prior control as a whole was either functional or non functional and it remembered intervening events. With a microprocessor control it is desirable to only disable the processor means, while retaining basic control functions independent of the microprocessor. If during the duration of power outage a secondary overcurrent trip means trips the recloser or the utility desires to change the distribution path by activating a lockout signal, it would not be desirable to close the recloser when power is resupplied to the recloser control.

SUMMARY OF THE INVENTION

The microprocessor based recloser control of my invention includes a memory means which is independent of the processor means of the control, in that it may be additionally altered by input means which are independent of the microprocessor. The independent memory is alterable with minimal energy to allow its alteration during periods of extended control power outage. When the recloser control is resupplied power, information in the independent memory is supplied to the processor means to allow the recloser control to appropriately respond to events occurring during a period when the processor means is disabled.

One close binary memory element of the independent memory is used as a close control bit to close the recloser, if the processor means was attempting to reclose when the processor means was disabled. The close binary element assumes a set state on processor means command, when the control is attempting a reclose if power may be lost to the processor means. The processor means may also command the close binary element to assume a reset state under appropriate conditions. Such conditions include a recloser trip or processor means response to conditions which cause the processor means to issue a trip or lockout command. Regardless of the operability of the processor means, the close binary element will assume a reset state, if the recloser control attempts to trip the recloser or input means attempt to cause a trip or lockout condition.

DETAILED DESCRIPTION OF THE DRAWING

Figure 1:
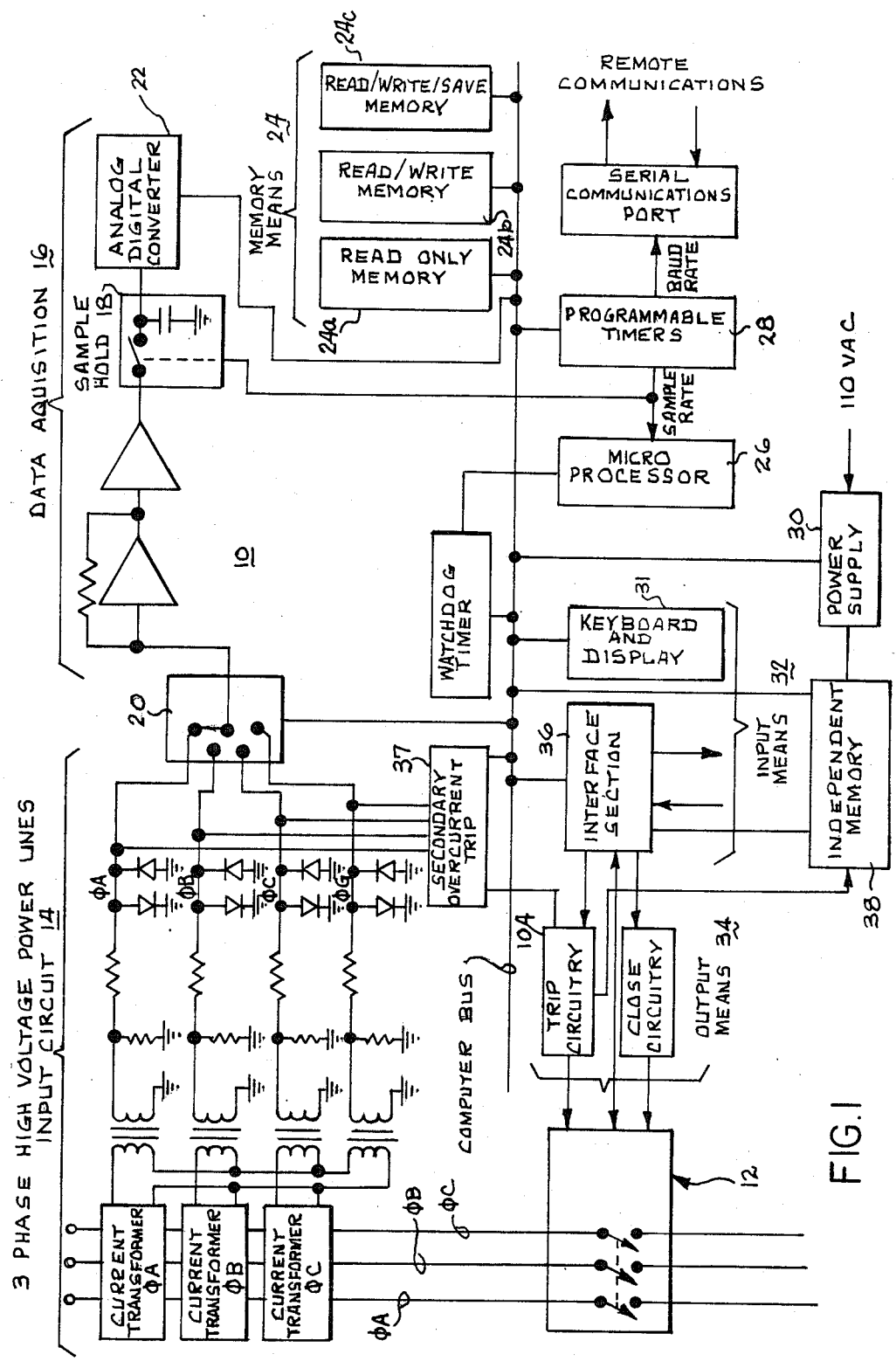
FIG. 1 is a block diagram of a microprocessor based recloser control connected to a recloser which protects a three-phase power distribution line.

FIG. 1 illustrates a microprocessor based recloser control 10 operatively connected to a recloser 12 protecting a three-phase power distribution line. The recloser control 10 includes an input circuit 14 for sensing current in each of the three phases and ground of the power distribution line and providing an analog signal of the current to data acquisition means 16. Data acquisition means 16 includes a sample and hold circuit 18 which progressively samples the analog signal for each phase and ground of the input circuit 14 preferably with a multiplexer 20 which sucessively presents each analog output of the input circuit 14 to the input of the sample and hold circuit 18. The output of the sample and hold circuit 18 is digitized by analog to digital converter 22 and thereafter stored in memory means 24. Memory means 24 typically comprises a variety of different kinds of solid state memories. Read only memory 24a is a non-volatile memory programmed at the factory. Read/Write Memory 24b is a volatile memory which is alterable by the microprocessor and provides information to the microprocessor. On power loss, Read/Write Memory 24b contents are lost. Read/Write/Save Memory 24c is a non-volatile memory which is alterable by the microprocessor and provides information to the microprocessor. On power loss, its contents are retained for an extended time. Processor means 26 has as a primary function generating an equivalent to a mean square value for each digitized input signal, comparing the mean square equivalent value of the inputs with a preselected one of a number of time current characteristics stored in memory means in accordance with other command information stored in the memory means, and issuing an operational command which causes the recloser to change its state between close and the trip conditions. Processor means 26 additionally regulates how information is exchanged between various components of the control. Programmable timers 28 in cooperation with the processor means 26 determine among other things the rate at which signals are multiplexed in multiplexer 20 and sampled in sample and hold circuit 18. Power Supply 30 is supplied power from the upstream side of recloser 12 through a transformer providing a 110 volts of alternating current. Power Supply 30 provides a variety of regulated and unregulated power at different voltages, selectively. Recloser control 10 includes input means 32 and output means 34. Input means 32 provides information to recloser control 10 and includes a keyboard and a display 31 mounted on the recloser control front panel. Output means 34 provides signals to open and close recloser 12. Input means 32 and output means 34 are closely associated with interface section 36. Interface section 36 accepts and issues information to and from the utility. Additionally, interface section 36 isolates the higher voltage components of the control and higher voltage utility signals from the lower voltage portions of the control, such as processor means 26. Typically, isolation is achieved with optical isolaters or diode protection as appropriate. Recloser control 10 further includes a secondary overcurrent trip circuit 37 which allows the recloser to be tripped when processor means 26 is disabled for lack of power for reliable operation. Further details of the operation and circuitry of recloser control 10 are disclosed in U.S. Pat. No. 4,535,409 filed on Sept. 18, 1981 of which I am an inventor.

Recloser control 10 additionally has an independent memory 38, which is alterable by processor means 26 and by input 32 and output 34 means regardless of whether processor means 26 is enabled. Independent memory 38 is alterable with miminal energy supplied by power supply 30.

Figure 2:
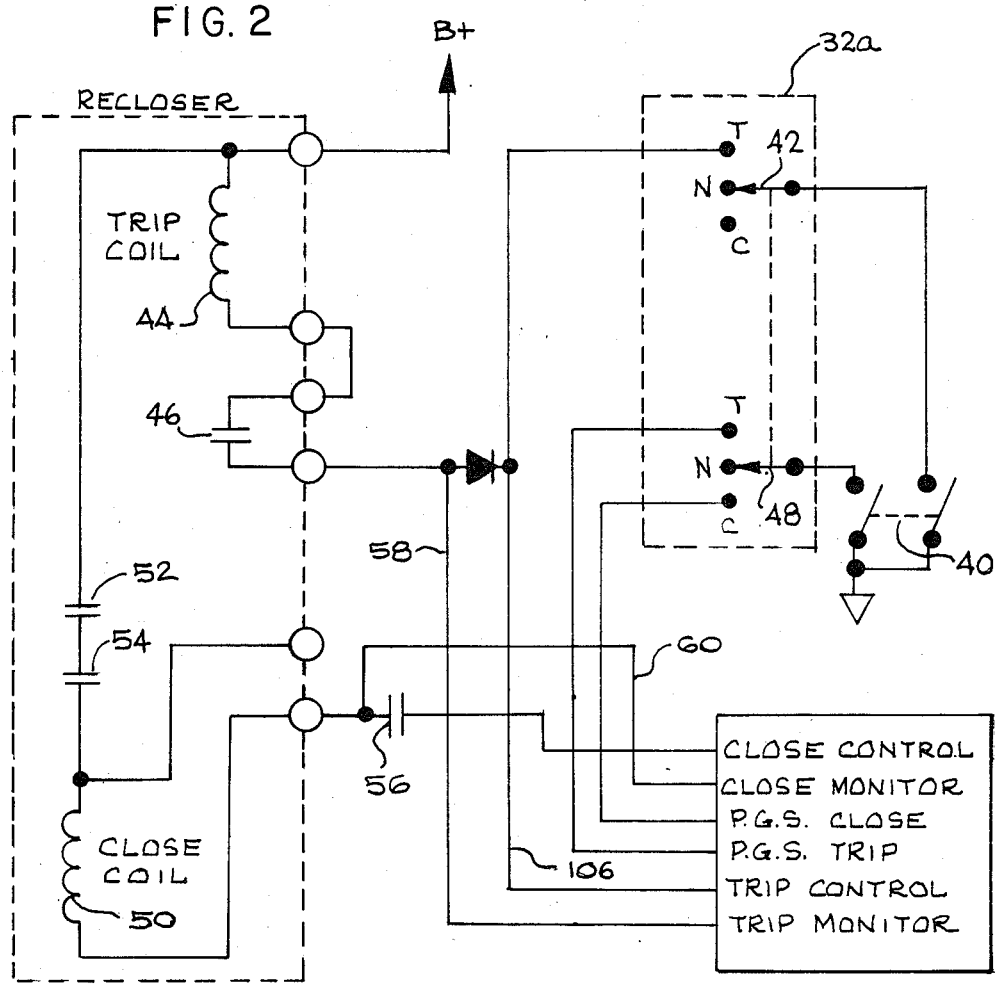
FIG. 2 is a illustration of a portion of the recloser control relating to operator actuation of the recloser.

FIG. 2 is a schematic showing interconnections between recloser control 10 and recloser 12 in greater detail. Pistol grip switch 32a is a double pole, double throw switch mounted on the front panel of recloser control 10. Pistol grip switch 32a is spring loaded to return to its neutral position and allows an operator to change the state of the recloser 12 at its location. If it is desired to allow only remote actuation of recloser 12, defeat contacts 40, operable from the front panel of recloser control 10, may be opened. The poles in pistol grip switch 32a serve markedly different functions. Pole 42 provides a hard-wire connection to ground for trip coil 44 causing recloser 12 to open when pistol grip 32a is thrown to the trip position. Same interlock contact 46 is located in recloser 12 and is mechanically interlocked to assume the same state as the recloser interrupting contacts. Trip coil 44 obtains power from Power Supply 30.

Signal pole 48 provides information to processor means 26 which cause it to issue either a trip or close command. When pole 48 is switched to the trip position it functions through the agency of processor means 26 to issue a trip signal to recloser 12. When pole 48 is thrown to the close position, it causes processor means 26 to ground close coil 50. Opposite interlock contact 52 is mechanically interlocked with the switch mechanism of recloser 12 to assume a opposite state to the interrupting contacts. Breaker contact 54, also a mechanically actuated contact in the recloser, is actuated by a lever bar which forces the main interrupting contacts to an open or tripped position. Non-reclose contact 56 is operable from the front panel of recloser control 10 to prevent reclosing a tripped recloser. Trip monitor lead 58 and close monitor lead 60 provide recloser state information to the remainder of the control 10 through interface section 36.

Figure 3:
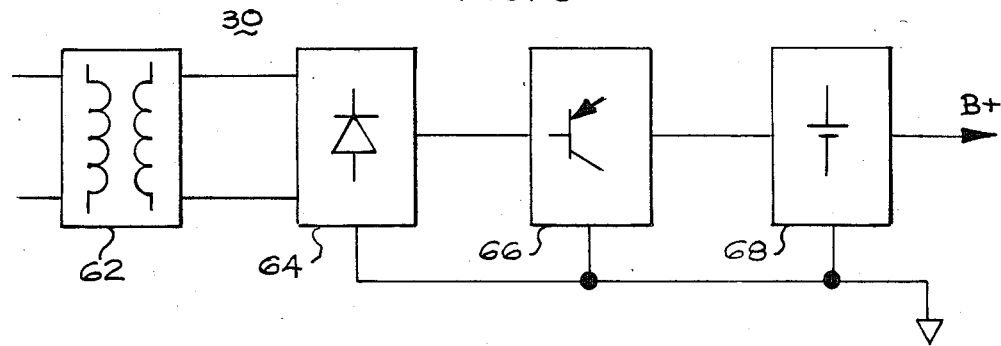
FIG. 3 is a simplified block diagram of a power supply used in the microprocessor based recloser control.

FIG. 3 is a simplified schematic of power supply 30. It includes transformer 62 which converts the nominal 110 volt alternating current supply to a nominal 24 volts. Rectifier 64 rectifies to direct current the 24 volt alternating current supplied. Regulator 66 provides, among other things, a regulated 24 volt supply and charges energy storage means 68, which is preferably a battery.

Figure 4:
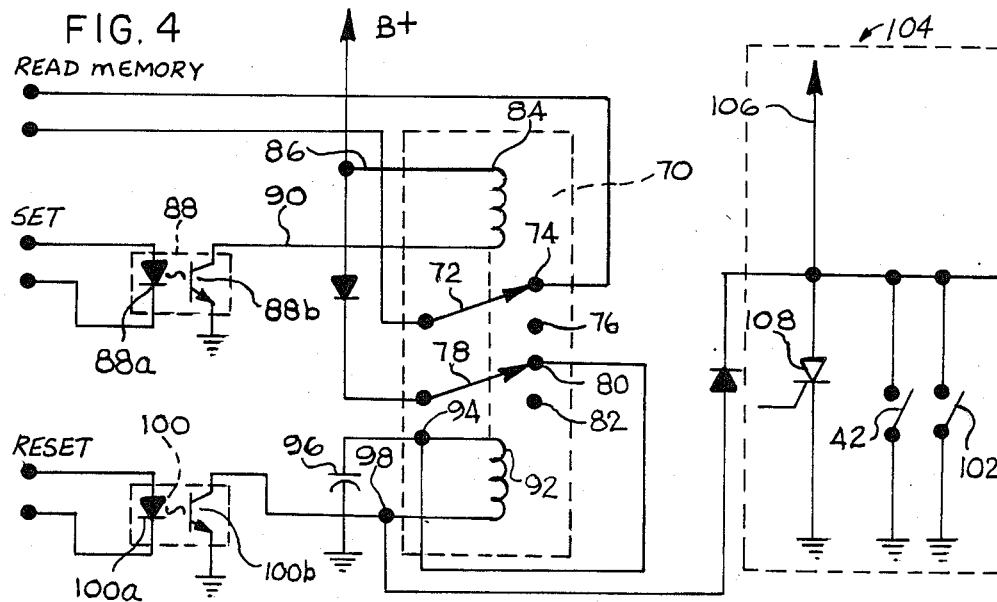
FIG. 4 illustrates a preferred embodiment of the independent memory interconnected with other portions of the microprocessor based recloser control.

FIG. 4 illustrates a preferred embodiment of independent memory 38 and some of its interconnections to input means 32 and output means 34 of recloser control 10. Independent memory 38 is preferrably assembled with low energy latching relays. Only a single binary close memory element 70 (one relay) is illustrated. It is well within the skill of the art to use a number of latching relays to build a multi-element independent memory from the illustration. Close memory element 70 includes a sensed pole 72 switchable between a set sensed contact 74 and a reset sensed contact 76. A second or power pole 78 of the double pole double throw latching relay is ganged with sensed pole 72 and is switchable between set power contact 80 and reset power contact 82. Poles 72 and 78 are switched to their set position by energizing set coil 84. Set coil 84 is connected at its power termination 86 to the B+ supply of power supply 30. Set coil 84 is energized by activating set switch 88 which is connected between a set coil switched termination 90 and ground. Set switch 88 is a portion of interface section 36 and, is preferably an optically isolated switch including a light emitting diode 88a and a photo transistor 88b.

Poles 72 and 78 of closed memory element 70 are urged to their reset contacts by reset coil 92. Reset coil 92 has its power termination 94 connected to the set power contact 80. When power pole 78 is in the set position, power termination 94 is connected to the B+ supply of power supply 30. Reset capacitor 96 is connected between power termination 94 and ground. When close memory element 70 is in a set codition reset capacitor 96 is charged with sufficient energy to reset close memory element 70 when reset coil 92 is grounded. Switched termination 98 of reset coil 92 may be grounded through a variety of paths. Processor means 26 can issue a signal to reset switch 100 causing it to complete the path between switched termination 98 and ground. Reset switch 100 operates similarly to set switch 88. Additional paths to ground are also provided in interface section 36. Input means 32 include trip contacts of pistol grip switch 32a. When pole 42 is thrown to the trip position, close memory element 70 is reset. Similarly, when remote lockout contact 102 is thrown to ground, by the utility, close memory element 70 assumes a reset condition. Recloser 12 can receive a trip signal from interface section 36 which includes trip circuitry 104. Trip circuitry 104 is separately shown in FIG. 1 to emphasize that it is operable by secondary overcurrent trip circuit 37. Trip switch 108 in FIG. 4, here shown as a SCR, is the portion of trip circuitry 104 which grounds trip coil 44 through conductor 106 in FIG. 2.

Processor means 26 may set close memory element 70 by activating set switch 88. Similarly, close memory element 70 may be caused to assume a reset state on processor means 26 command by means of reset switch 100. Additionally, it may assume a reset state on a signal furnished by input means 32 or trip switch 108 in FIG. 4.

Microprocessor base recloser control 10 functions to appropriately open and close recloser 12 by means of a variety of complex algorithms or steps to insure proper operation under a variety of conditions. A detail explanation of some of the more subtle algorithms is provided in U.S. Pat. No. 4,535,409 filed Sept. 18, 1981 of which I am an inventor. Simplified flowcharts illustrating the program steps using independent memory 38 are presented in FIGS. 5, 6 and 7 of the drawing in this application.

Figure 5:
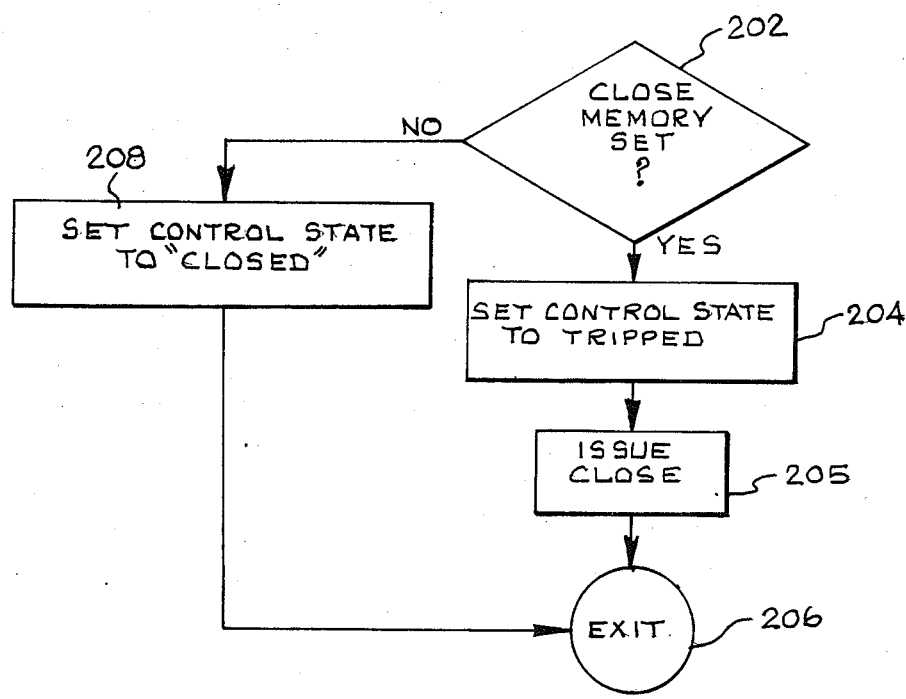
FIG. 5 is a simplified flowchart illustrating a portion of the program run by a processor means of the microprocessor recloser control when power is initially supplied to it.
Figure 6:
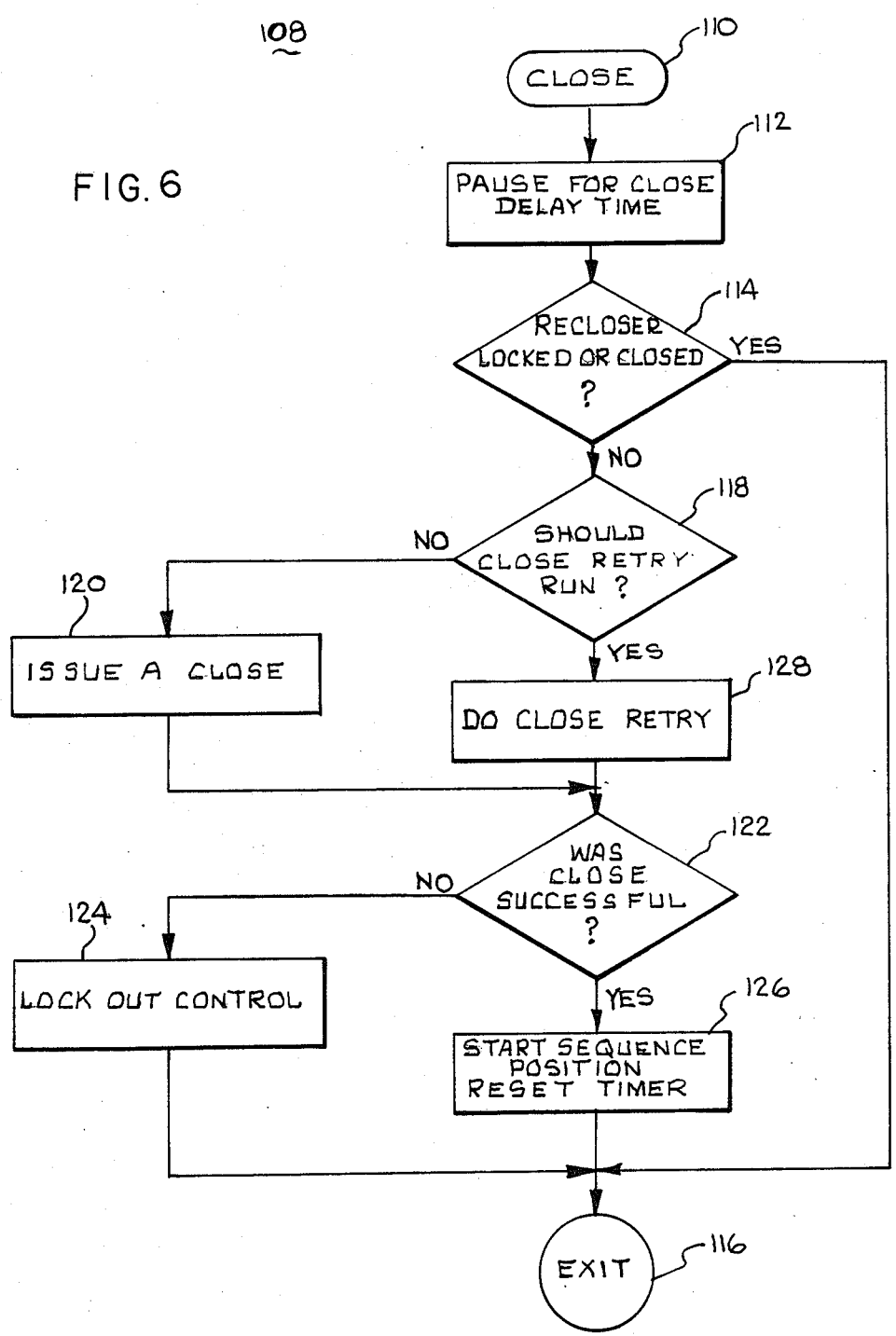
FIG. 6 is a flowchart of the steps undertaken by the processor means to issue a close signal to the recloser.
Figure 7:
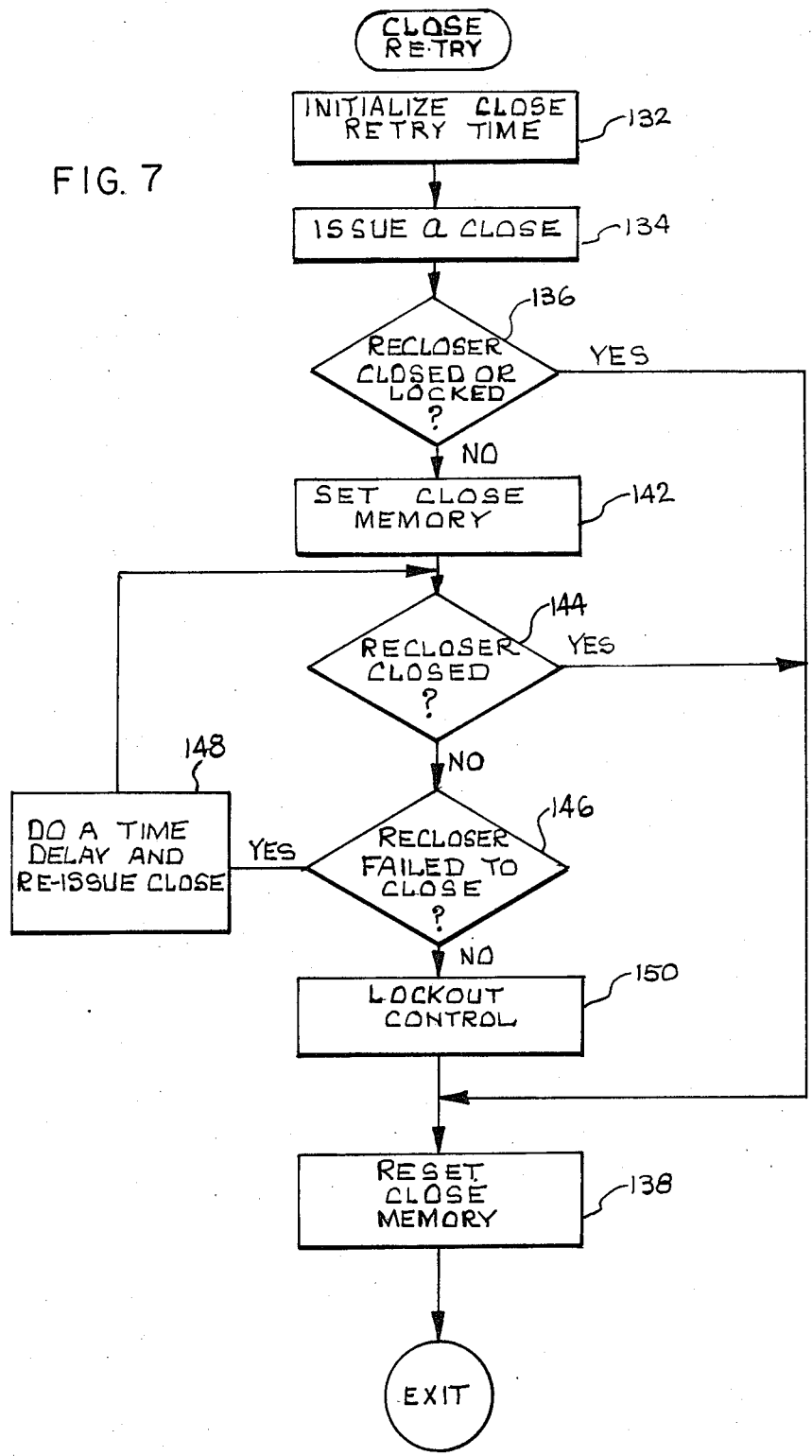
FIG. 7 is a flowchart of a close retry routine run by the processor means if the recloser control was attempting to close the recloser when the processor means was disabled and power is resupplied to the recloser control.

FIG. 5 is a simplified flowchart of the initial steps the processor means 26 performs when stored energy is sufficient to insure its reliable operation. The power up routine 200 only illustrates those steps necessary to understand how processor means 26 accepts information from close memory element 70. The close memory element 70 is first examined in decision diamond 202. If the close memory element 70 is in set state, the recloser must be tripped and, a control state flag is set to a trip state in block 204. Next a close routine is called in block 205. This close routine is illustrated in FIG. 6. Ultimately when power up routine is completed, processor means 26 exits from the routine at point 206. If the close memory element 70 is found to be reset in decision diamond 202, a control state flag is set to a close state in block 208. Thereafter the processor means exits from power up routine 200 at exit block 206.

On the completion of power up routine 200 close routine 108 illustrated in FIG. 6 is performed when close memory element 70 is in a set state. Close routine 108 begins with the issuance of a close signal 110. After a suitable delay the state of the recloser and whether a lock out condition exist is made in decision diamond 114. Decision diamond 114 performs a software check to see whether the control state flag, settable in block 208 of power up routine 200, is set. At this point, decision diamond 114, a lock flag state is also examined to see if it is set. If the recloser is closed or locked out, the program is immediately terminated in exit step 116. If the recloser is open but not locked out, a determination is made as to whether a close retry routine should be run in decision diamond 118. This provision allows the information contained in close memory element 70 to be ignored. Under some conditions it may be desirable to bypass the set close routine such as when the utility orders a remote close signal or the pistol grip switch 32 is operated. If the set close routine is not to be run, a close signal is issued in block 120. After a suitable period of time, a determination as to whether or not a close occurred is made in close decision diamond 122. If the recloser did not successfully close, a command is issued to lock out the recloser control in lock out block 124. Thereafter, the program is completed in exit point 116. In the event that the close was successful, as determined in close decision diamond 122, a sequence position reset timer is started in block 126. After a suitable period of time, the microprocessor recloser control will initialize the sequence position memory when the timer times out. After the sequence timer is started in block 126 the program terminates in exit point 116.

If the close retry routine was not defeated in decision diamond 118, the close retry routine is run in block 128. The close retry routine is further explained in FIG. 7. After it is run in block 128, the program proceeds to close decision diamond 122 and the steps thereafter are the same as those following the step of issuing a close in close block 120. As may be readily appreciated, close retry block 128 is in fact a branching instruction which compresses FIG. 7 into close routine 108.

The first step in the close retry routine 130 is to initialized close retry time in block 132. Close retry time is the interval between successive attempts to reclose the recloser 12. This time is programmable to a period between 1 and 60 seconds. After initilization in block 132, a close command is issued in block 134. The duration of a close command also is selectively programmable to a period between 1 and 100 cycles of the 60 Hertz current. After this interval, the state of recloser 12 is checked in decision diamond 136. If the recloser has closed or is locked out, close memory element 70 is reset in reset block 138 and the program is completed at exit point 140. If it is determined, in decision block 136, that the recloser is open and unlocked the close memory element 70 is set in block 142. Thereafter, in decision diamond 144, the state of the recloser is reexamined. If the recloser is closed, the program skips to reset block 138. In the event that the recloser is not closed, a check is made in decision diamond 146 to see whether or not the time for the recloser to close has elapsed. If the recloser has failed to close in time, another attempt to reclose is made in block 148 after the closed retry time has elapsed. Thereafter, the program branches back to a reexamination of the recloser in decision diamond 144 and proceeds. In the event that the recloser failed to reclose as determined in block 146 as inconsistent state exists. Under that condition the control is locked out in lockout block 150 and the program proceeds to reset the independent memory in block 138.

It should be understood that various modifications, changes and variation may be made in the arrangment operation and details of construction of the elements and processes disclosed herein without departing from the spirit and scope of this invention.

What is claimed is:

1. A recloser control comprising:

an input circuit for sensing current in each phase of a power line comprised of a first phase, a second phase, a third phase and a ground, and for sensing current in the ground, and providing an analog signal corresponding to the current in each of said phases and said ground;

a data acquisition means including a sample and hold circuit for sampling the analog outputs of the input circuit and maintaining each analog output sampled for a desired preselected holding period, and an analog to digital converter for converting the analog output of the sample and hold circuit to a digital form, said digital form providing an input signal to a processing means;

memory means for storing command information in digitized form including normalizing references, time current characteristics, instantaneous trip values, number of operations associated with a given time current characteristic, time intervals for selected measurements and operations, and status information such as digitized current magnitudes from said data acquisition means;

processing means for generating an equivalent to a mean square value for each input signal from said data acquisition means, comparing the mean square equivalent values of the inputs with a preselected one of a number of time current characteristics stored in memory means in accordance with other command information stored in the memory means, and issuing an operation command which causes a recloser to change its state between close and trip conditions;

a power supply for selectively supplying power to the other portions of the recloser control from the power line being protected, said power supply including a storage means to supply power when the power lines being protected are interrupted;

output means for activating trip means in the recloser in accordance with operation commands from the processor means or trip signal from the secondary overcurrent trip circuitry, or close means in the recloser in accordance with operational commands from the processor means;

input means for entering command information; and independent memory means interconnected among said power supply storage means, said processor means and said input means, said independent memory means supplying information to said processor means and being alterable by said processor when said processor means is supplied sufficient operating power and, being alterable by said input means, when said processor means is not supplied sufficient operating power.

2. A recloser control as claimed in claim 1 wherein said independent memory means is a single binary close memory element which assumes a set state when said processor means is attempting to close the controlled recloser and assumes a reset state when the close is completed on processor means command, the single binary element may assume a reset state although the microprocessor is disabled if said output means assumes a trip state.

3. A recloser control as claimed in claim 1 wherein said independent memory comprises at least one low energy latching relay.

4. A recloser control as claimed in claim 3 wherein said latching relay includes:
   a sensed pole switchable between set and reset sensed contacts to supply information to said processor means;
   a power pole ganged with said sensed pole connected to one leg of said power supply and switchable with said sensed pole between set and reset power contacts;
   a set coil connected to the one leg of said power supply at said set coil's power termination contact for switching said poles to engage their set contacts;
   a reset coil connected to said set power contact at said reset coil's power termination for switching said poles to engage their reset contacts;
   a reset capacitor connected between said set power contact and an opposite leg of said power supply to supply energy to said reset coil;
   a set switch responsive to processor means command connected between said set coil's switched termination and the opposited leg of said power supply for energizing said set coil on issuance of a processor means set command; and
   a reset switch responsive to processor means command connected between said reset coil's switched termination and the opposite leg of said power supply for energizing said reset coil on issuance of a processor means reset command, the switched termination of said reset coil also connected to input means switches connected to the opposite leg of said power supply for energizing said reset coil independently of said processor means.

5. A recloser control as claimed in claim 4 wherein the switched termination of said reset coil is also connected to a trip switch controlling a trip coil of a recloser to insure that said latching relay assumes a reset condition any time a trip operation is initiated, by connecting the switched termination of said reset coil to the opposite leg of said power supply.

6. A recloser control as claimed in claim 4 wherein said set switch is a phototransistor activated by a light emitting diode; and
   said reset switch is a photo transistor activated by a light emitting diode.

7. The recloser control claimed in claim 1 wherein the processor means carries out a predetermined sequence of steps to insure that the recloser will close when the recloser control is repowered after a loss of power, if recloser was attempting to close when power was lost causing a single binary close memory element of said independent memory to assume a set state, said predetermined sequence of steps including:
   determining whether the close memory element of said independent memory has assumed a set state;
   issuing a close command if said single binary element has assumed a set state;
   determining whether the recloser failed to close within a predetermined close time; and
   reissuing a close command if the recloser has failed to close within the predetermined close time.

8. The recloser control claimed in claim 1 wherein said processor means carries out a predetermined sequence of steps in issuing an operation command to change the recloser from a trip condition to a close condition including:
   initializing a close retry time;
   issuing a close signal to said output means;
   determining if the recloser is closer or locked out after a predetermined closed time;
   causing a single binary close memory element of said independent memory to assume a reset state, if said recloser is closed or locked out;
   causing the close memory element of said independent memory to assume a set state, if said recloser is open and not locked out;
   redetermining if the recloser is closed after a predetermined close time;
   causing the close memory element to assume a reset state, if the recloser is closed;
   determining if the recloser has failed to close within the predetermined closing time if the recloser is not closed;
   reissuing a close signal to said output means after a predetermined close retry time delay, if the recloser was determined to have failed to close within the predetermined close time and returning to the above step of redetermining if the recloser is closed;
   locking out the recloser, if the recloser was determined to have failed to close for a reason unconnected with a mere elapse of the close time; and
   causing the close memory element to assume a reset state.

* * * * *